Figure 1:
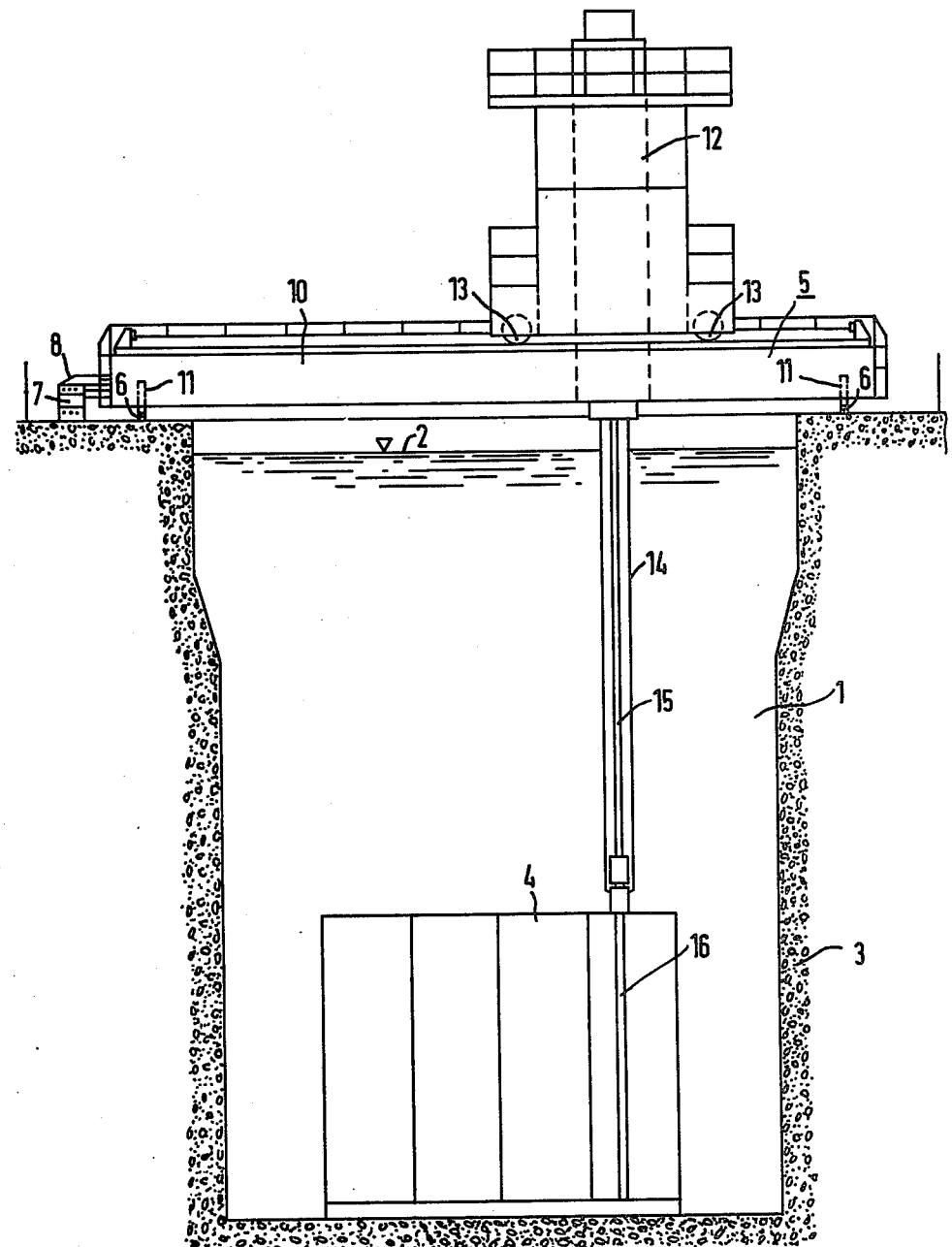

United States Patent [19]
Neuenfeldt et al.

[11] 4,269,660
[45] May 26, 1981

[54] DEVICE FOR TRANSPORTING RADIOACTIVE MATERIAL

[75] Inventors: Walter Neuenfeldt, Schmitten; Heiner Siegert, Wiesbaden; Günter Zeitzschel, Frankfurt, all of Fed. Rep. of Germany

[73] Assignee: Kraftwerk Union Aktiengesellschaft, Mülheim, Fed. Rep. of Germany

[21] Appl. No.: 921,993

[22] Filed: Jul. 5, 1978

[30] Foreign Application Priority Data

Jul. 6, 1977 [DE] Fed. Rep. of Germany ....... 2730569

[51] Int. Cl.³ .......................................... G21C 19/20
[52] U.S. Cl. ..................................... 176/30; 250/505; 414/146
[58] Field of Search ....................... 176/30, 31, 32, 33, 176/37; 250/505, 506, 507, 509, 510, 515, 518; 414/146, 561

[56] References Cited

U.S. PATENT DOCUMENTS

| 3,039,949 | 6/1962 | Newton | 414/146 |
| 3,838,289 | 9/1974 | White | 250/507 |

FOREIGN PATENT DOCUMENTS 1225951  3/1971  United Kingdom ..................... 250/507

*Primary Examiner*—Donald P. Walsh
*Attorney, Agent, or Firm*—Herbert L. Lerner

[57] ABSTRACT

Device for transporting radioactive material having a lifting mechanism displaceable along a travel path, includes an operator's cab shielded against radiation and displaceable with the lifting mechanism along the travel path, a control console for actuating the lifting mechanism, the control console being disposed in and displaceable with the cab, filter means through which the cab is ventilated with filtered air, and means for testing the ventilating air for freedom thereof from radiation.

6 Claims, 2 Drawing Figures

DEVICE FOR TRANSPORTING RADIOACTIVE MATERIAL

The invention relates to a device for transporting radioactive material and, more particularly, fuel elements or assemblies of nuclear reactors in a deposition facility, and includes a lifting device or loading machine which is displaceable along a travel path or track and is operated or actuated by a control console which is displaceable along with the lifting device.

Heretofore known transporting devices have an open or exposed control station or console. Those transporting devices are therefore operated by the operating personnel in protective clothing if there is danger that the personnel may be exposed to radiation or contamination. The nuisance of having to wear protective clothing has heretofore been of secondary importance since such transporting devices were customarily employed in nuclear power stations, where radioactive material had to be transported only for a relatively short time.

It is, therefore, an object of the invention to overcome the above-mentioned shortcomings of heretofore known devices of this general type and to provide a transporting device which will alleviate the working conditions for the operating personnel. This is of special importance for deposition facilities, wherein spent fuel elements or assemblies from many nuclear power plants come together, so that the transport of such fuel elements occurs daily and this task is expediently performed by trained personnel. It is especially important, in this regard, that the personnel is neither subjected to radiation nor impeded by elaborate protective clothing.

With the foregoing and other objects in view, there is provided, in accordance with the invention, a device for transporting radioactive material having a lifting mechanism displaceable along a travel path, comprising an operator's cab shielded against radiation and displaceable with the lifting mechanism along the travel path, a control console for actuating the lifting mechanism, the control console being disposed in and displaceable with the cab, filter means through which the cab is ventilated with filtered air, and means for testing the ventilating air for freedom thereof from radiation. Then, the operating personnel can work as in a normal atmosphere. Only in the case when the device for checking, or testing for freedom from radiation indicates excessive radiation, must countermeasures of a special nature be taken.

In accordance with another feature of the invention, there are provided emergency ventilating means in the form of an air bottle carried along with the lifting mechanism. Thus, if freedom from radiation should no longer be assured, the emergency air bottle will restore that freedom. This may happen, for example, if the filter should become saturated or spent.

In accordance with a further feature of the invention, there are provided means responsive to testing means for blocking the ventilation through the filter means when radiation is detected in the ventilating air. This, of course, can be done automatically. The emergency ventilation afforded by the air bottle can be simultaneously put into operation. In general, however, a signal would seem to be sufficient to alert the operating personnel. Then the normal ventilation through the filter is shut off by hand and the emergency ventilation is put into operation. A relatively small air bottle is sufficient if the time gained thereby is only used to drive the transporting device to an end location thereof at which the operating personnel can leave the operator's cab. However, it is also conceivable, theoretically, to continue the operation by using a sufficiently large air bottle until it is possible to switch to normal ventilation after the filter is replaced.

The radiation shielding of the operator's cab can be accomplished by conventional means, such as by using heavy metals, concrete or the like.

In accordance with an added feature of the invention, the operator's cab has a window therein formed of heavy glass.

In accordance with an additional feature of the invention, the heavy glass is lead glass.

Such large-area observation openings which are cut out from the normal shielding are advantageous for the operation of the transporting device. In some cases, they can also be replaced by endoscopic means i.e. observation facilities with fiber optics or television cameras. It is particularly important in connection with the operation of a water-filled fuel element storage pit to avoid disturbances of the observation due to reflections which are experienced when looking down upon the surface of the water in the storage pit.

In accordance with a concomitant feature of the invention, the device, in combination with a water-filled fuel-element storage pit, comprises a telescoping periscope extensible from the lifting mechanism to below the water surface in the storage pit.

Other features which are considered as characteristic for the invention are set forth in the appended claims.

Although the invention is illustrated and described herein as embodied in device for transporting radioactive material, it is nevertheless not intended to be limited to the details whown, since various modification and structural changes may be made therein without departing from the spirit of the invention and within the scope and range of equivalents of the claims.

Figure 2:
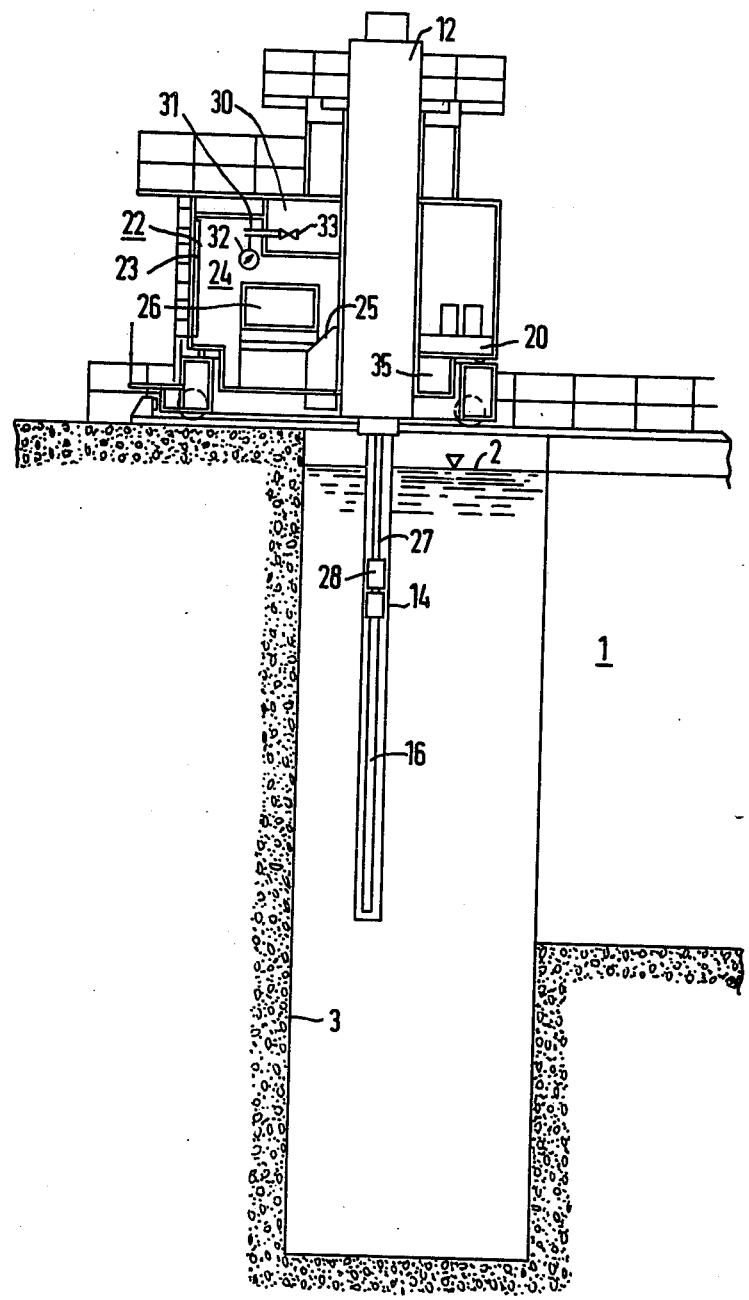

The construction and method of operation of the invention, however, together with additional object and advantages thereof will be best understood from the following description of specific embodiments when read in connection with the accompanying drawings, in which:

FIGS. 1 and 2 are two diagrammatic elevational orthogonal views of the device for transporting radioactive material according to the invention.

Referring now to the figures of the drawings, it is readily apparent that the device for transporting radioactive material according to the invention is part of a deposition facility for spent fuel elements of nuclear reactors. This facility includes a water-filled pit 1, filled with water to a level 2. The walls 3 of the pit 1 are constructed of concrete with contours as shown in the figures. As shown in FIG. 1, a storage rack 4 for the fuel elements, which constitute the radioactive material to be transported, stands in the pit 1. The radioactive-material transporting device according to the invention, generally identified as 5, travels on two rails 6 disposed above and extending along both sides of the pit 1. On one side of the pit 1, as seen in FIG. 1, a current supply in the form of contact or "third" rails 7 and a current collector 8 is provided parallel to the rails 6.

The transporting device 5 includes a traverse or crossbeam 10 which is able to travel in longitudinal direction of the pit 1 i.e. perpendicularly to the plane of the drawing of FIG. 1, on the rails 6 by means of rollers 11, shown in dotted lines. On the traverse 10, there is, in turn, disposed a lifting mechanism or hoist 12 which can travel on wheels 13 in longitudinal direction of the traverse 10 i.e. transversely to the longitudinal direction of the pit 1.

The lifting mechanism 12 includes a guide mast 14 for guiding a fuel element gripper 15 which is telescopically constructed and can transport fuel elements 15 into and out of the fuel element storage rack 4. The lifting mechanism 12, as seen in FIG. 2, is equipped with a gripper changing device 20 since it is expected that fuel elements from different types of reactors, which must be grasped by different grippers, will arrive at the deposition facility. The gripper changing device 20 can be operated by remote control i.e. without direct contact or involvement by the personnel.

The transporting device 5, as best seen in FIG. 2, further includes an operator's cab 22 which is associated with the lifting mechanism 12 and is equipped with shielded walls 23. The shielded walls 23 are constructed, for example, of steel plates 30 to 50 mm thick, which are provided especially for protection against the predominant gamma radiation. The shielded walls 23 thus define a radiation-shielded interior chamber 24 wherein control consoles 25 are disposed. The control consoles 25 permit direct operation of the parts of the installation which belong to the device 5, namely, the lifting mechanism 12 with the gripper 15 and a drive mechanism for moving the lifting mechanism 12 along the traverse 10 as well as for moving the traverse 10 per se. The exercise of appropriate control necessary in this regard is exercised in accordance with observations or monitoring of the deposition facility effected through large windows 26 which are constructed of heavy shielding glass. The large window areas thus provide the same shielding effect as the walls 23 of the operator's cab 22.

A telescoping periscope 27, having an eye-piece 28, is combined with the gripper 15 into a structural unit. The eye-piece 28 extends below the water surface 2, so that direct observation or monitoring is possible in the vicinity of the gripper 15 without any danger of reflection at the water surface 2 or any need for special measures against radiation in vicinity of the fuel elements 16.

The interior chamber 24 of the shielded cab 22 of the operator or driver is normally ventilated through filters 30 which are provided in a separately shielded space above the operator's cab 22, so that no separate hoses or tubing are necessary for ventilating the cab. A non-illustrated outlet pipe stub or connecting piece, through which air is drawn in through the filters 30 and is then passed on through an outlet 31 into the interior chamber 24 is sufficient for ventilation. A radiaition detector 32 is associated with the outlet 31 and serves as a device for testing or checking for freedom from radiation. The radiation detector 32 responds to all kinds of radiation which could become dangerous to personnel present in the cab 22. The detector can, for example, be an ionization chamber sensitive to gamma radiation. In principle, however, $\alpha$ and/or $\beta$ radiation can also be detected.

If necessary freedom from radiation is no longer assured, the ventilation of the operator's cab 22 can be shut off by a valve 33. After the valve 33 is closed, ventilation is switched to a tank 35, which is radiation-shielded and contains radiation-free air. Ventilation can also be effected from a replaceable accompanying air bottle instead of from the tank 35 which is permanently connected to the cab 22. This is especially useful if this so-called "external ventilation" serves only to ensure a supply of air for the operating personnel until the operator's cab 22 has reached a location provided for shielded discharge or exiting of the personnel therefrom.

We claim:

1. Device for transporting radioactive material having a lifting mechanism displaceable along a travel path, comprising an operator's cab for accommodating operating personnel therein shielded against radiation and displaceable with the lifting mechanism along the travel path, a control console for actuating the lifting mechanism, said control console being disposed in and displaceable with said cab, filter means through which said cab is ventilated with filtered air, and means for testing the ventilating air for freedom thereof from radiation.

2. Device according to claim 1 including emergency ventilating means in the form of an air bottle carried along with the lifting mechanism.

3. Device according to claim 1 including means responsive to said testing means for blocking the ventilation through said filter means when radiation is detected in the ventilating air.

4. Device according to claim 1 wherein said operator's cab has a window therein formed of heavy glass.

5. Device according to claim 4 wherein said heavy glass is lead glass.

6. Device according to claim 1 in combination with a water-filled fuel-element storage pit, comprising a telescoping periscope extensible from the lifting mechanism to below the water surface in the storage pit.

* * * * *